(12) United States Patent
Pappu et al.

(10) Patent No.: US 10,379,980 B2
(45) Date of Patent: Aug. 13, 2019

(54) MAINTAINING IO BLOCK OPERATION IN ELECTRONIC SYSTEMS FOR BOARD TESTING

(71) Applicant: Intel Corporation, Santa Clara, CA (US)

(72) Inventors: Lakshminarayana Pappu, Folsom, CA (US); James J. Grealish, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 15/468,523

(22) Filed: Mar. 24, 2017

(65) Prior Publication Data

US 2018/0276094 A1  Sep. 27, 2018

(51) Int. Cl.
  *G06F 11/00*  (2006.01)
  *G06F 11/22*  (2006.01)

(52) U.S. Cl.
  CPC .................. *G06F 11/2221* (2013.01)

(58) Field of Classification Search
  CPC .................................................. G06F 11/2284
  USPC .............................................................. 714/43
  See application file for complete search history.

(56) References Cited

U.S. PATENT DOCUMENTS

| | | | | |
|---|---|---|---|---|
| 5,875,293 A * | 2/1999 | Bell | ................. | G06F 11/22 714/27 |
| 6,279,050 B1 * | 8/2001 | Chilton | ................. | G06F 3/0613 710/104 |
| 6,839,867 B2 * | 1/2005 | Nunn | ................. | G06F 11/2284 713/1 |
| 2004/0064285 A1 * | 4/2004 | Repko | ................. | G01R 31/2808 702/120 |
| 2008/0172578 A1 * | 7/2008 | Tsai | ................. | G06F 11/2284 714/36 |
| 2008/0246509 A1 * | 10/2008 | Xiao | ................. | G06F 1/24 326/39 |
| 2009/0249126 A1 * | 10/2009 | Cui | ................. | G06F 11/2733 714/43 |
| 2011/0298530 A1 * | 12/2011 | Kent | ................. | G01R 31/318572 327/540 |
| 2012/0146673 A1 * | 6/2012 | Kim | ................. | G01R 31/3187 324/750.3 |
| 2012/0179300 A1 * | 7/2012 | Warren | ................. | G05D 23/1902 700/278 |
| 2012/0212244 A1 * | 8/2012 | Zhao | ................. | G01R 31/3025 324/750.01 |
| 2013/0054949 A1 * | 2/2013 | Berke | ................. | G11C 5/14 713/2 |

(Continued)

*Primary Examiner* — Christopher S McCarthy
(74) *Attorney, Agent, or Firm* — Schwabe, Williamson & Wyatt, P.C.

(57) ABSTRACT

Embodiments are generally directed to maintaining IO block operation in electronic systems for board testing. An embodiment of a system includes a processor; a power management block for the system; a plurality of IO (input/output) blocks; a read only memory for storage of firmware for the processor. The system is to provide support for a board-level test of the system including testing of one or more IO blocks of the plurality of IO blocks; and the firmware includes elements to stall a reset sequence of the system including the system branching to a mode that maintains power to the one or more IO blocks.

21 Claims, 6 Drawing Sheets

(56) References Cited

U.S. PATENT DOCUMENTS

| | | | |
|---|---|---|---|
| 2016/0091531 A1* | 3/2016 | Park | G01R 1/0408 |
| | | | 324/756.07 |
| 2016/0111169 A1* | 4/2016 | Kim | G11C 29/12005 |
| | | | 714/718 |
| 2018/0007032 A1* | 1/2018 | Pappu | G06F 13/4282 |
| 2018/0172759 A1* | 6/2018 | Pappu | G01R 31/2853 |
| 2018/0275736 A1* | 9/2018 | Pappu | G06F 1/3203 |

* cited by examiner

MAINTAINING IO BLOCK OPERATION IN ELECTRONIC SYSTEMS FOR BOARD TESTING

TECHNICAL FIELD

Embodiments described herein generally relate to the field of electronic devices and, more particularly, maintaining IO block operation in electronic systems for board testing.

BACKGROUND

In the testing of high speed electronic devices such as circuit board testing, testing is difficult at operational speeds. In conventional operation of a computer platform, when a reset sequence is run, the reset process is to shut down each unnecessary element to reduce power consumption.

However, the IO (input-output) blocks will be shut down if the system is taken out of operational mode. Board testing generally requires that all components be powered in order to provide testing of such components.

Further, the addition of internal switching to a platform to enable the testing operation of IO blocks in platform testing would be very expensive and difficult to implement into boards for testing purposes.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to maintaining IO block operation in electronic systems for board testing.

In some embodiments, an apparatus, system, or process provides for maintenance of power for IO blocks in a reset procedure to enable platform or board testing. In some embodiments, an apparatus, system, or method operates to prevent firmware from shutting down IO blocks during a reset procedure. In some embodiments, an apparatus, system, or process provides power management capabilities to override reset and power wakeup signals, thereby enabling the maintenance of power to the IO blocks during the reset process and allowing for platform testing.

In some embodiments, an apparatus, system, or process operates to prevent the firmware of a system from shutting down the IO blocks, such as CSI (Camera Serial Interface), Display, DDR (Double Data Rate), and other IO blocks, during the reset sequence. In some embodiments, hooks are added to the firmware, wherein adding hooks refers to creating an alternative execution branch for the power-management firmware for use in board-level testing of the system. As used herein, IO blocks refer to IO blocks, circuits, components, or other structures.

In some embodiments, in board testing mode capabilities are added to a power management block to override reset signals and power-wakeup signals for several of the IPs (input pins), obviating the need for a complete reset sequence. In some embodiments, an apparatus, system, or method provides for maintaining IO block operation for testing. In some embodiments, the maintenance of IO block operation includes preventing firmware from shutting down IO components during reset sequence, and providing power management capabilities to override reset and power wakeup signals.

In the removal of platform power there is a hook to stall the process of removing the power indefinitely to allow for platform testing without the removal of power. In some embodiments, the stall operation occurs by operation of a bootstrap process. In some embodiments, upon receiving the reset command, the bootstrap process is commenced, and then stops. The instruction for the platform testing mode causes the bootstrap to be de-asserted and then stalled. Thus, in a system reset the platform operation is capable of halting the system at the beginning of the boot process. In some embodiments, instructions are added to the firmware for the platform test mode to bypass the IO shutdown and instead enter a reduced power mode or state, wherein the reduced power mode may be a semi-sleep mode or other similar mode in which certain functions are available. In some embodiments, the platform test mode operates to power up the required IO components for the purpose of platform testing.

Figure 1:
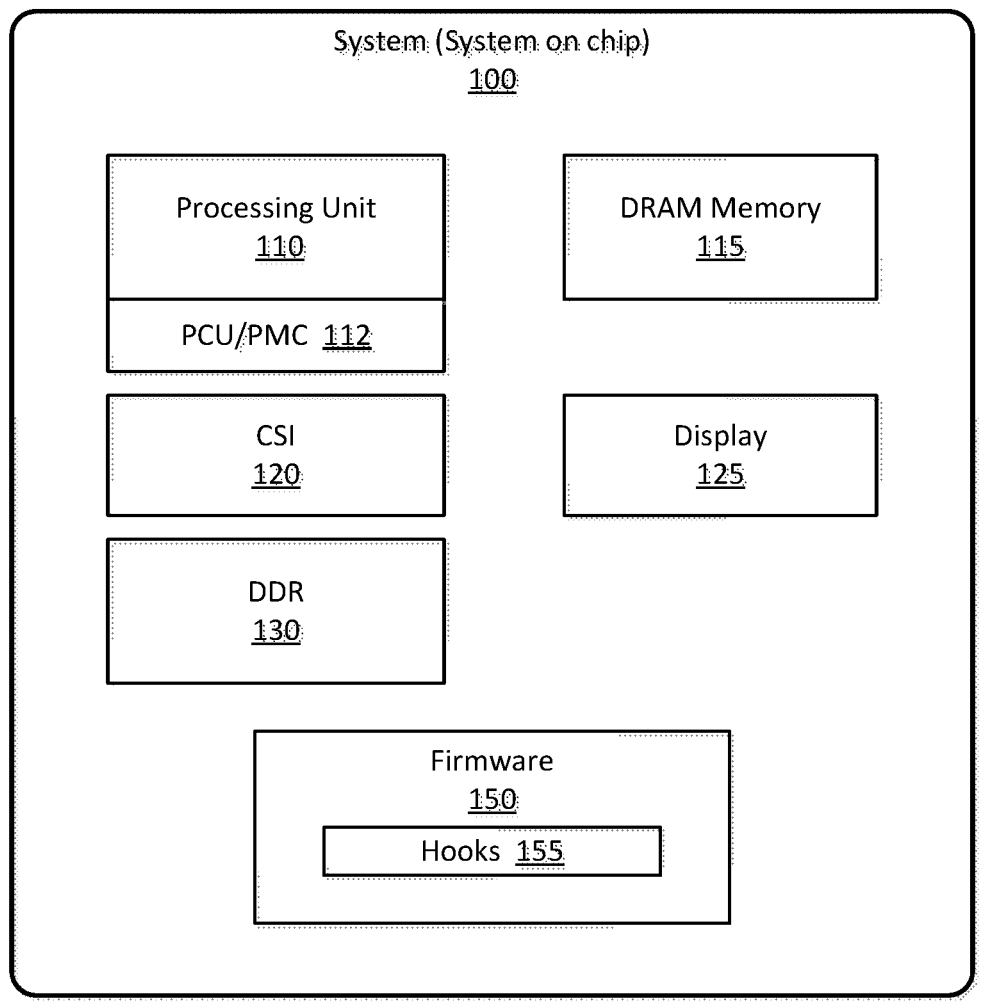
FIG. 1 is an illustration of system providing for maintenance of IO block operation for board testing.

FIG. 1 is an illustration of a system providing for maintenance of IO block operation for board testing according to an embodiment. As illustrated the system 100, such as a system on chip (SoC), includes a processor 110, wherein the processor may include power control elements such as the illustrated PCU/PMC (platform controller unit/power management controller) 112. The system further includes elements such as memory, DRAM (dynamic random access memory) 115, and various IO blocks, such as the illustrated CSI 120, display 125, and DDR (double data rate) 130 IO blocks. Also illustrated is the firmware 150, which is generally stored in read-only memory ROM.

In a reset operation, a conventional system will shut down the IO blocks to reduce power consumption, which will result in interfering with a board-level test of the system that requires that each IO block be powered. In some embodiments, the system 100 will utilize added firmware hooks 155 to prevent the shutdown of the IO blocks, the added firmware elements operating to override reset and power wakeup signals, thereby enabling the maintenance of power to the IO components during the reset process and allowing for platform testing. In some embodiments, a power management block includes capability to override reset and power wakeup signals in a reset sequence.

A system such as a system on chip design typically has 5 main phases of a reset sequence. The activities in these phases are in general the following:

Phase-0: The power rails for the system are ramped up.

Phase-1: Various "Power-Good" signals are asserted, the Power-Good signals indicating that the power rails are stable and it is safe for units to start un-gating processes. In this phase certain of the clocks are enabled, and an initial set of critical fuses are downloaded.

Phase-2: The system agent (SA, which is mainly the uncore of the CPU) and the Ring (logic that connects the CPU and Graphics to SA) are out of reset. In this phase of the reset process most of the fuses are downloaded and distributed.

Phase-3: The Ucode (Intel CPU microcode) that controls the CPU initializes and brings the CPU out of reset.

Phase-4: The memory controller is out of reset and the BIOS initialization commences.

Phase-1 and Phase-2 are generally run by the PCU/PMC (Platform Controller Unit/Power Management controller) elements of the CPU or other similar components, running the "P-code" (firmware) from a pcode ROM (Read Only Memory) and a Patch RAM (Random Access Memory). In Phase-2, after the fuses are downloaded, the PCU, based on the fuse values, shuts down various IOs to save power. All the power critical IOs are shut off, to be woken up later if required during the functional mode of operation by various agents. The BIOS could be one of the agents that wake up the DDR (Double Data Rate Memory), Display, and other IOs.

However, this default system behavior in the reset process interferes with the board level testing mode of operation because the board-level testing requires that all IOs to be powered up in order to be tested.

In some embodiments, an apparatus, system, or process utilizes added firmware hooks to stall the Pcode, wherein the Pcode may be stalled either immediately after the fuses download during the Phase-2 of the reset sequence but before phase-2 completes or immediately after power-goods are issued after the end of the phase-1.

Figure 2:
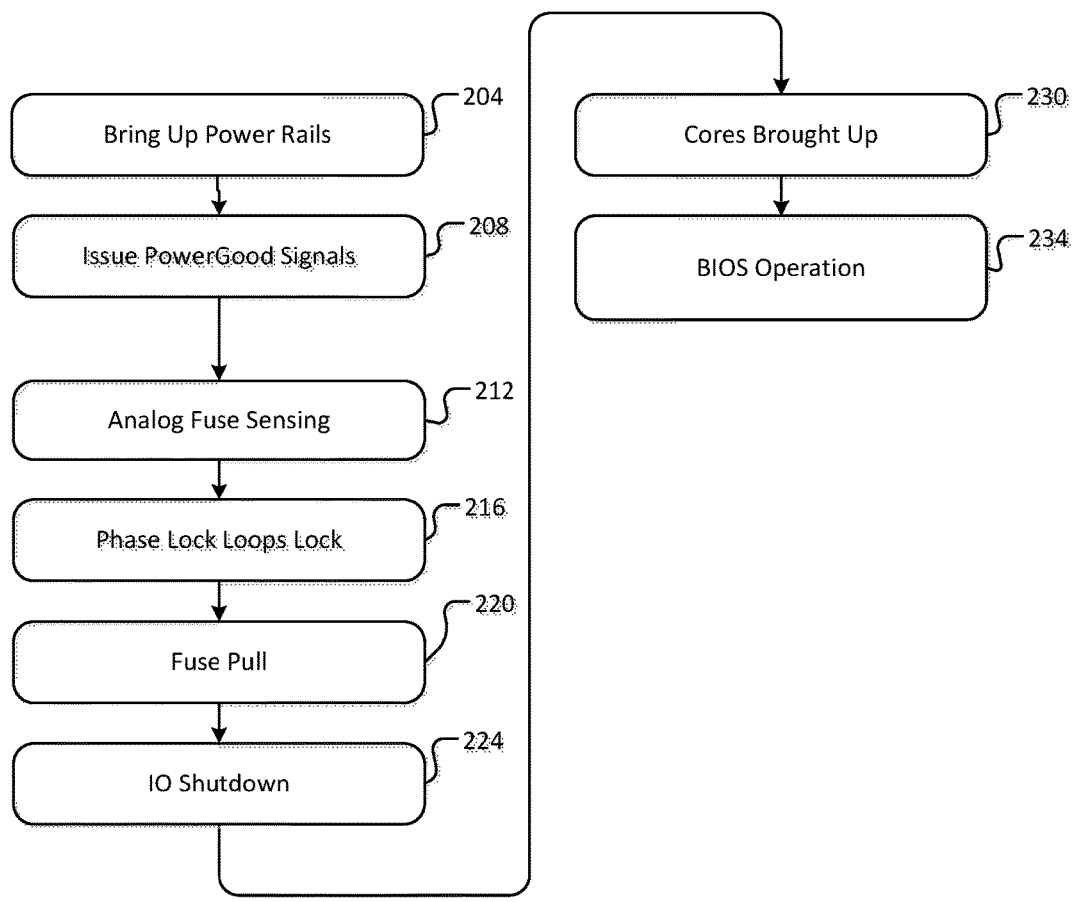
FIG. 2 illustrates a conventional reset sequence for a system.

FIG. 2 illustrates a conventional reset sequence for a system. In this illustration, a conventional reset process includes the following:

204: Bringing up the power rails of the system.
208: Issuing Power-Good signals.
212: Analog fuse sensing.
216: Phase lock loops (PLLs) for clocking lock.
220: IO shutdown, thereby shutting down each of the IO blocks.
230: Bringing up CPU cores.
234: Commencing BIOS operation.

Figure 3:
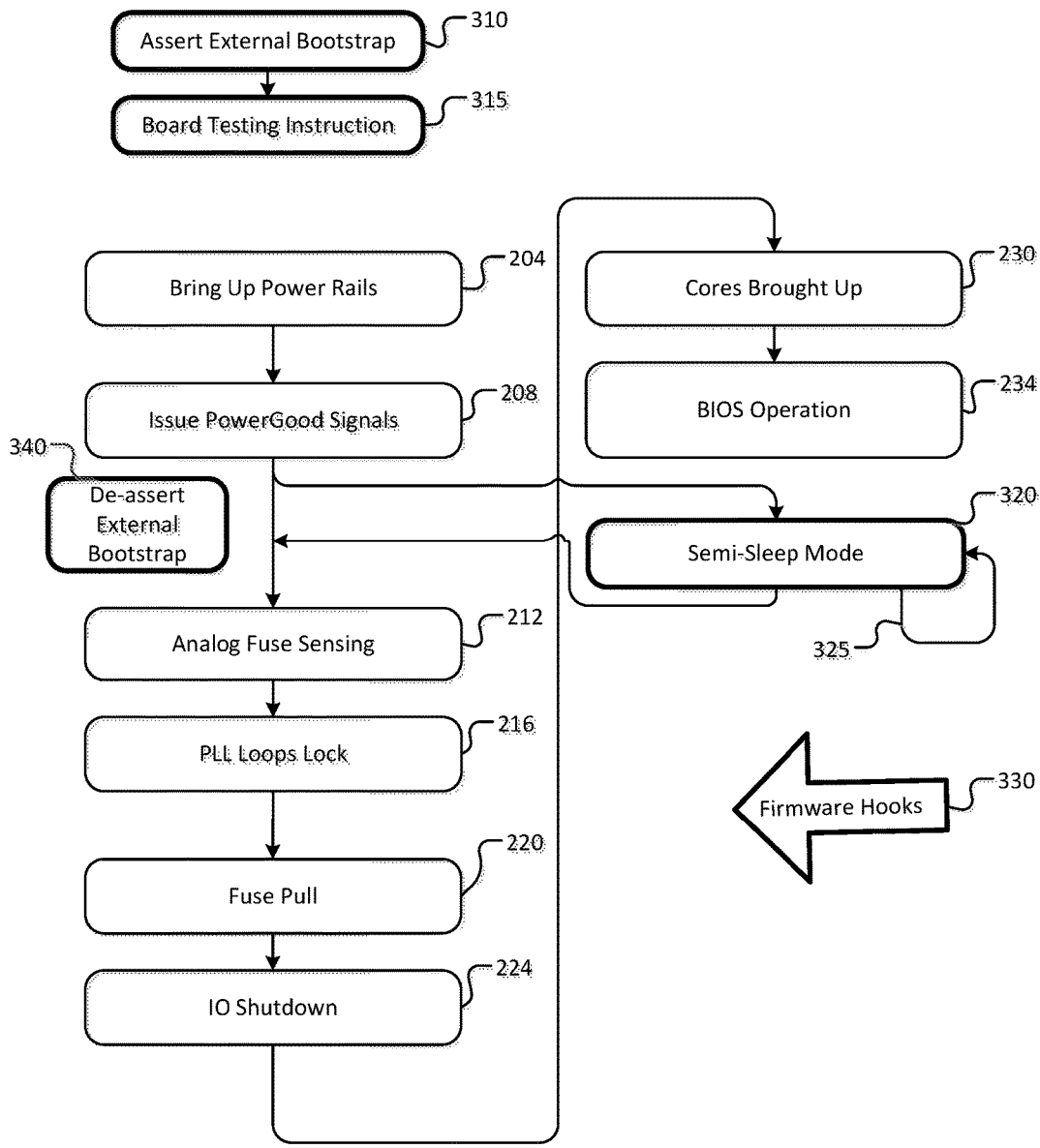
FIG. 3 is an illustration of a reset sequence to maintain power to IO blocks according to an embodiment.

FIG. 3 is an illustration of a reset sequence to maintain power to IO blocks according to an embodiment. FIG. 3 illustrates an alternative firmware branch flow to support board-level testing. In the illustrated operation, the firmware branch flow is to prevent the firmware from shutting down the IOs for power saving in a reset operations because board testing requires all components to be powered. In some embodiments, in addition a special TAP instruction, Board Setup, and other hardware hooks cause the power management block to override the power good signals and reset signals going to various functional blocks.

As illustrated in FIG. 3, an embodiment of a reset sequence includes the following.

Upon initializing the reset sequence, a user is to assert an external bootstrap 310 and provide a board testing instruction 315. Following bringing up the power rails of the system, causing the processor cores to come up (204) and issuing Power-Good signals if the power rails are stable (208), the process branches as follows:

320: Through the implementation of firmware hooks 330 to modify the process, the reset process is stalled. In some embodiments, an apparatus, system, or method includes an alternative firmware branch for a platform testing mode. In the platform testing mode, rather than going into shutdown, the IO blocks enter a reduced power mode such as a semi-sleep mode 320, in which the process remains in an infinite loop 325 until removed from semi-sleep mode in response to de-assertion of the external bootstrap 340 to continue the reset sequence (212-234). In some embodiments, the semi-sleep mode maintains power to the IO blocks, thus enabling testing of such blocks.

FIG. 3 illustrates the concept of causing the firmware to enter into an infinite loop mode, and thereby preventing the system from completing the remainder of the reset sequence. Firmware hooks 330 allow the system to bypass IO shutdown for the purpose of platform testing. In some embodiments, after the fuse pull, there is a bypass from to the shutdown process, enabling retention of elements under power as needed. In some embodiments, the platform is to transfer directly from the operational mode to the semi-sleep mode in the form of the infinite process loop. In some embodiments, the operation proceeds as follows:

At power on, the system stalls for dfx aggregator authentication. The user asserts an external bootstrap to extend the authentication window.

A user accessible tap instruction enables the user to inform the PCU to execute a board-testing reset sequence.

The bootstrap is de-asserted to enable the system to execute the functional reset.

After downloading the fuses and without shutting off the IOs, the PCU enters an infinite loop-mode.

In some embodiments, a user-accessible "Board_setup" instruction is provided. This instruction controls various board setup hooks that have added in the Punit and the PCU. In some embodiments, to override the "power gate controls" that control the power to various IOs and to override the "power-good" signals that allow IPs to come out of reset, the instruction asserts (board_setup_en) to the individual IOs to override their local power management controls. Board_setup is executed before any board testing operation starts in order to provide sufficient time for power reset related glitches to subside from the time IP is powered up to the time board testing operation commences.

Figure 4:
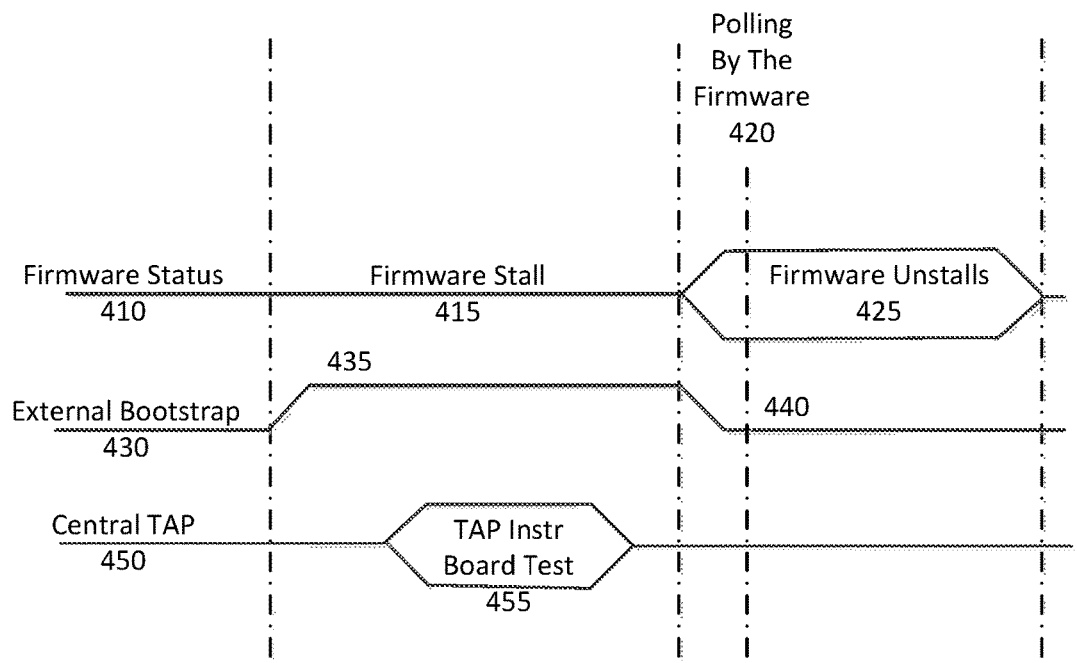
FIG. 4 is an illustration of waveforms for a board testing mode according to an embodiment.

FIG. 4 is an illustration of waveforms for a board testing mode according to an embodiment. FIG. 4 illustrates waveforms for firmware status 410, the external bootstrap, and the central TAP (Test Access Port) 450.

As illustrated in FIG. 4, for entering board level testing the firmware status 410 enters a firmware stall 415, and the external bootstrap 430 is asserted 435. In this status the IO blocks remain powered, allowing application of the TAP instruction for the board-level testing process 455.

Upon the completion of the board-level testing process 455 for the system, the reset process for the system may resume. As illustrated, polling by the firmware 420 (or other detection process) detects the un-stalling of the firmware 425, which occurs with the de-assertion 440 of the external bootstrap 430.

Figure 5:
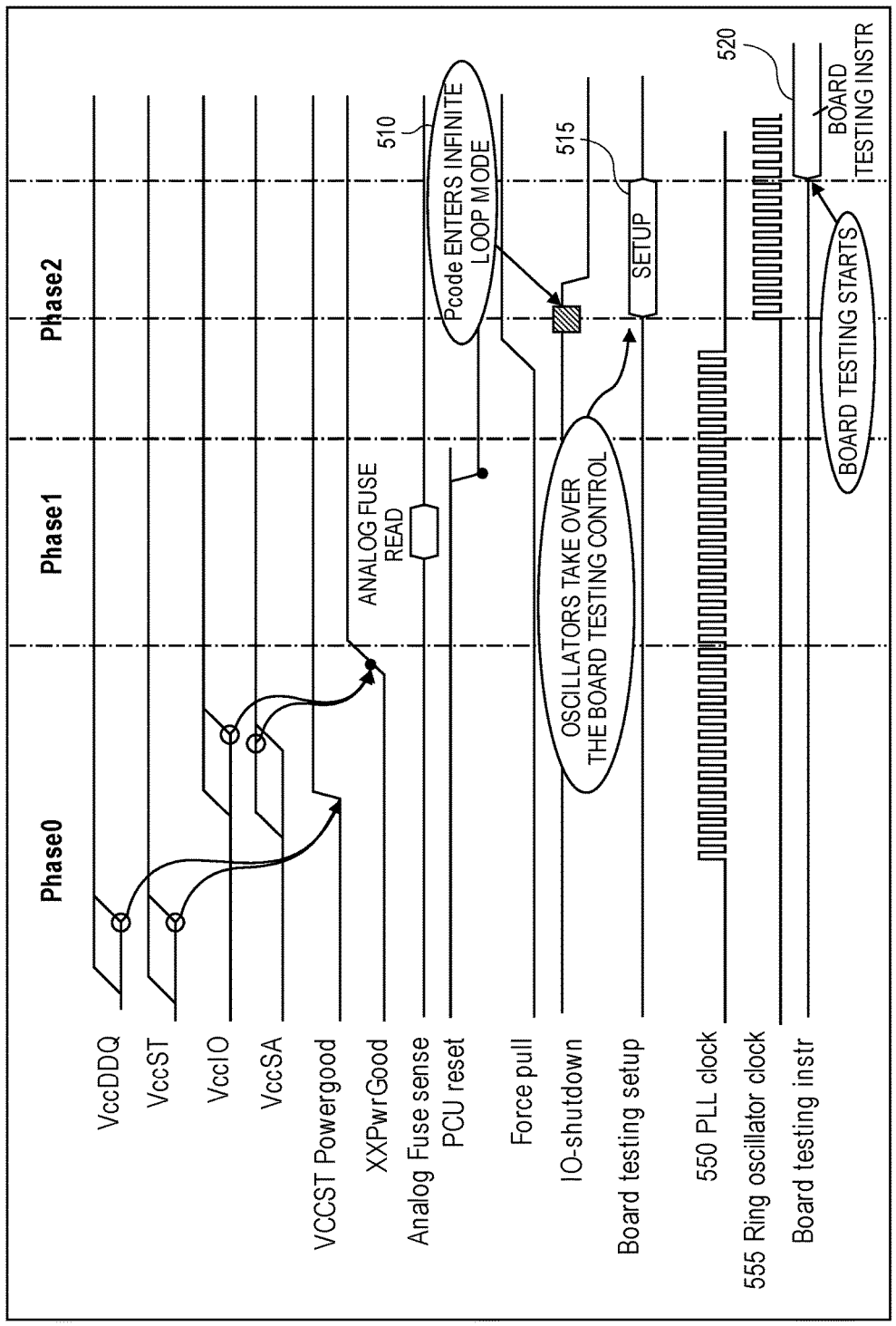
FIG. 5 is a timing diagram to illustrate operations in a reset sequence to support board-level testing of a system according to an embodiment.

FIG. 5 is a timing diagram to illustrate operations in a reset sequence to support board-level testing of a system according to an embodiment. FIG. 5 illustrates bringing up the various power rails (VccDQ, VccST, VccIO, VccSA) of the system in a Phase-0, and the resulting Power-Good signals for the Phase-1. In Phase-1 there is illustrated the analog fuse read and the PCU reset.

In some embodiments, the succeeding Phase-2 includes the Pcode/firmware entering the infinite loop mode 510 and the board testing setup 515 to enable the board-level testing instruction 520, including the testing of the IO blocks without loss of power to such blocks.

It is noted that FIG. 5 further includes the implementation of a ring oscillator clock for the testing process, illustrating a PLL (Phase Lock Loop) clock 550 and ring oscillator clock 555. This concept may be implemented as provided in U.S. patent application Ser. No. 15/468,527, entitled "PLL Bypass For Board-Level Testing For System on Chips". However, embodiments under the present application are not limited to the implementation of a ring oscillator clock, and may utilize alternative clocking for the board-level testing.

Figure 6:
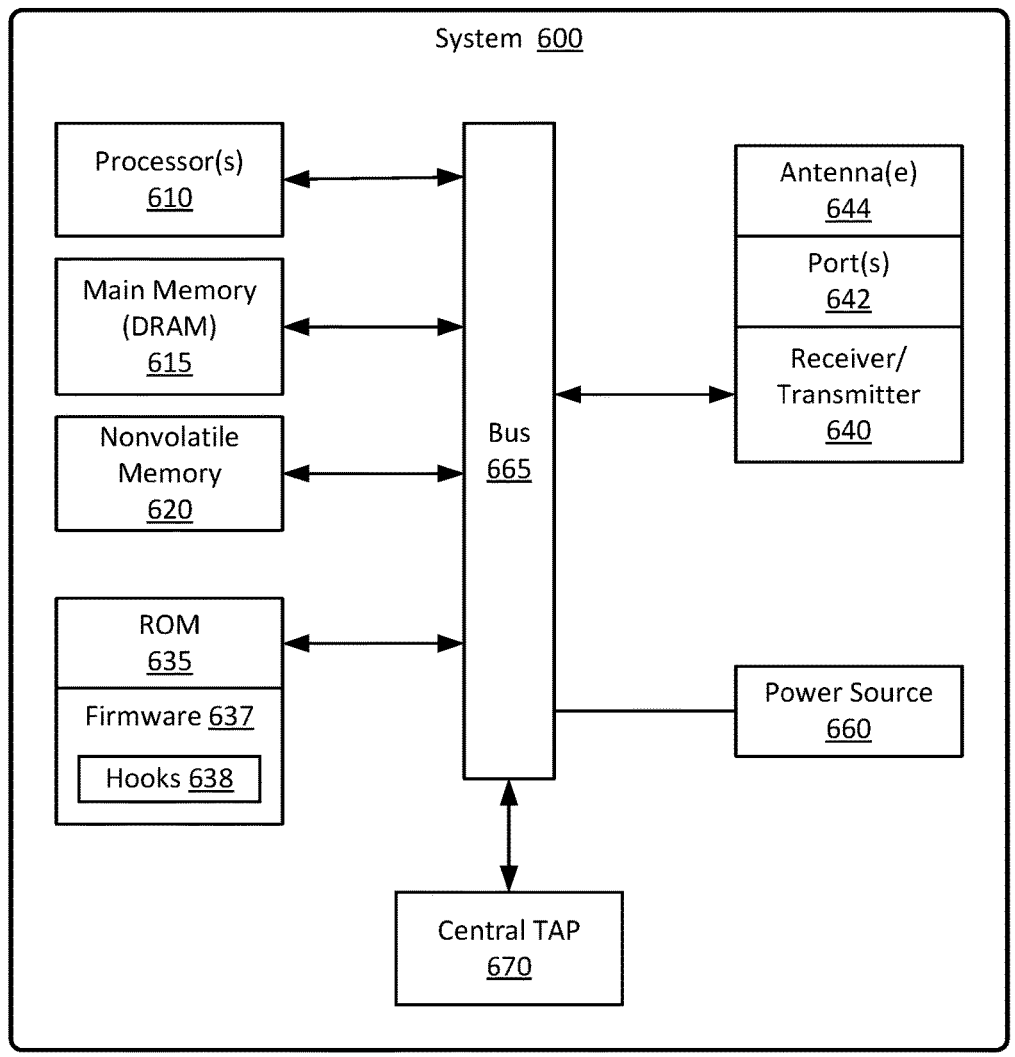
FIG. 6 is an illustration of a system to provide for maintenance of IO block operation for board testing according to an embodiment.

FIG. 6 is an illustration of a system to provide for maintenance of IO block operation for board testing according to an embodiment. In this illustration, certain standard and well-known components that are not germane to the present description are not shown. The system 600 may include an SoC (System on Chip) combining multiple elements on a single chip.

In some embodiments, the system 600, such as a computing system, may include a processing means such as one or more processors 610 coupled to one or more buses or interconnects, shown in general as bus 665. The processors 610 may comprise one or more physical processors and one or more logical processors. In some embodiments, the processors may include one or more general-purpose processors or special-purpose processors.

The bus 665 is a communication means for transmission of data. The bus 665 is illustrated as a single bus for simplicity, but may represent multiple different interconnects or buses and the component connections to such interconnects or buses may vary. The bus 665 shown in FIG. 6 is an abstraction that represents any one or more separate physical buses, point-to-point connections, or both connected by appropriate bridges, adapters, or controllers.

In some embodiments, the system 600 further comprises a random access memory (RAM) or other dynamic storage device or element as a main memory 615 for storing information and instructions to be executed by the processors 610. Main memory 615 may include, but is not limited to, dynamic random access memory (DRAM).

The system 600 also may comprise a non-volatile memory 620; and a read only memory (ROM) 635 or other static storage device for storing static information and instructions for the processors 610. In some embodiments, the ROM includes firmware 637 including hooks 638 to provide support for board-level testing of the system 600. In some embodiments, the test support includes operations as illustrated in FIGS. 3, 4, and 5.

In some embodiments, the system 600 further includes a central TAP (Test Access Port) 670, the central TAP 650 providing support for board level testing of the system.

In some embodiments, the system 600 includes one or more transmitters or receivers 640 coupled to the bus 665. In some embodiments, the system 600 may include one or more antennae 644, such as dipole or monopole antennae, for the transmission and reception of data via wireless communication using a wireless transmitter, receiver, or both, and one or more ports 642 for the transmission and reception of data via wired communications. Wireless communication includes, but is not limited to, Wi-Fi, Bluetooth™, near field communication, and other wireless communication standards.

The system 600 may also comprise a battery or other power source 660, which may include a solar cell, a fuel cell, a charged capacitor, near field inductive coupling, or other system or device for providing or generating power in the system 600. The power provided by the power source 660 may be distributed as required to elements of the system 600.

In some embodiments, a system includes a power management block for the system; a plurality of IO (input/output) blocks; and a read only memory for storage of firmware. In some embodiments, the system provides support for a board-level test of the system including testing of one or more IO blocks of the plurality of IO blocks; and the firmware includes elements to stall a reset sequence of the system including the system to branch to a mode that maintains power to the one or more IO blocks.

In some embodiments, the mode is a semi-sleep mode.

In some embodiments, the reset sequence is to remain in an infinite loop in the semi-sleep mode during the board-level test.

In some embodiments, stalling of the reset sequence includes the system to respond to assertion of a bootstrap. In some embodiments, the system is to return to the reset sequence upon de-assertion of the bootstrap.

In some embodiments, the power management block includes capability to override reset and power wakeup signals in a reset sequence.

In some embodiments, the one or more IO blocks include one or more of a CSI (Camera Serial Interface) block, a Display block, or a DDR (Double Data Rate) block.

In some embodiments, the system further includes a processing unit, the firmware to be executed by the processing unit.

In some embodiments, the system is a system on chip.

In some embodiments, a non-transitory computer-readable storage medium has stored thereon data representing sequences of instructions that, when executed by a processor, cause the processor to perform operations including initiating a reset sequence for a system; bringing up power rails for the system and issuing signals indicating stability of the power rails; in response to assertion of an external bootstrap and receipt of an instruction for a board level test, stalling the reset sequence, wherein stalling the reset sequence includes branching to a first mode to retain power to a plurality of IO (input/output) blocks; performing a board test of the system, the board test including testing of the plurality of IO blocks; in response to a de-assertion of the external bootstrap, exiting the first mode; and returning to the reset sequence for the system. In some embodiments, the stalling of the reset sequence is in response to elements of firmware for the system.

In some embodiments, the first mode is a semi-sleep mode.

In some embodiments, branching to the first mode includes remaining in an infinite loop in the semi-sleep mode during the board test.

In some embodiments, the one or more IO blocks include one or more of a CSI (Camera Serial Interface) unit, a Display unit, or a DDR (Double Data Rate) unit.

In some embodiments, an apparatus includes means for initiating a reset sequence for a system; means for bringing up power rails for the system and issuing signals indicating stability of the power rails; means for stalling the reset sequence, wherein stalling the reset sequence in response to assertion of an external bootstrap and receipt of an instruction for a board level test includes branching to a first mode to retain power to a plurality of IO (input/output) blocks; means for performing a board test of the system, the board test including testing of the plurality of IO blocks; means for exiting the first mode in response to a de-assertion of the external bootstrap; and means for returning to the reset sequence for the system. In some embodiments, the stalling of the reset sequence is in response to elements of firmware for the system.

In some embodiments, the first mode is a semi-sleep mode.

In some embodiments, the means for branching to the first mode includes means for remaining in an infinite loop in the semi-sleep mode during the board test.

In some embodiments, the one or more IO blocks include one or more of a CSI (Camera Serial Interface) unit, a Display unit, or a DDR (Double Data Rate) unit.

In some embodiments, a computing system includes one or more processors; main memory including dynamic random access memory (DRAM); a power management block for the system; a plurality of IO (input/output) blocks; and a read only memory for storage of firmware for the one or more processors. In some embodiments, the system provides support for a board-level test of the system including testing of one or more IO blocks of the plurality of IO blocks; and the firmware includes hooks to stall a reset sequence of the computing system including the system to branch to a mode that maintains power to the one or more IO blocks.

In some embodiments, the mode is a semi-sleep mode.

In some embodiments, the reset sequence is to remain in an infinite loop in the semi-sleep mode during the board-level test.

In some embodiments, stalling of the reset sequence includes the system responding to assertion of a bootstrap. In some embodiments, the computing system is to return to the reset sequence upon de-assertion of the bootstrap.

In some embodiments, the power management block includes capability to override reset and power wakeup signals in a reset sequence.

In some embodiments, the one or more IO blocks include one or more of a CSI (Camera Serial Interface) block, a Display block, or a DDR (Double Data Rate) block.

In some embodiments, the computer system further includes a transmitter or receiver for transmission or reception of data, and a dipole antenna for data transmission or reception.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A system comprising:
   a power management block for the system;
   a plurality of IO (input/output) blocks; and
   a read only memory for storage of firmware;
   wherein the system provides support for a board-level test of the system including testing of one or more IO blocks of the plurality of IO blocks; and
   wherein the firmware includes elements to stall a reset sequence of the system including the system to branch to a mode that maintains power to the one or more IO blocks, wherein the mode is a semi-sleep mode.

2. The system of claim 1, wherein the reset sequence is to remain in an infinite loop in the semi-sleep mode during the board-level test.

3. The system of claim 1, wherein stalling of the reset sequence includes the system to respond to assertion of a bootstrap.

4. The system of claim 3, wherein the system is to return to the reset sequence upon de-assertion of the bootstrap.

5. The system of claim 1, wherein the power management block includes capability to override reset and power wakeup signals in a reset sequence.

6. The system of claim 1, wherein the one or more IO blocks include one or more of a CSI (Camera Serial Interface) block, a Display block, or a DDR (Double Data Rate) block.

7. The system of claim 1, further comprising a processing unit, the firmware to be executed by the processing unit.

8. The system of claim 1, wherein the system is a system on chip.

9. A non-transitory computer-readable storage medium having stored thereon data representing sequences of instructions that, when executed by a processor, cause the processor to perform operations comprising:
   initiating a reset sequence for a system;
   bringing up power rails for the system and issuing signals indicating stability of the power rails;
   in response to assertion of an external bootstrap and receipt of an instruction for a board level test, stalling the reset sequence, wherein stalling the reset sequence includes branching to a first mode to retain power to a plurality of IO (input/output) blocks;
   performing a board test of the system, the board test including testing of the plurality of IO blocks;
   in response to a de-assertion of the external bootstrap, exiting the first mode; and
   returning to the reset sequence for the system;
   wherein the stalling of the reset sequence is in response to elements of firmware for the system.

10. The medium of claim 9, wherein the first mode is a semi-sleep mode.

11. The medium of claim 10, wherein branching to the first mode includes remaining in an infinite loop in the semi-sleep mode during the board test.

12. The medium of claim 9, wherein the one or more IO blocks include one or more of a CSI (Camera Serial Interface) unit, a Display unit, or a DDR (Double Data Rate) unit.

13. A computing system comprising:
   one or more processors; main memory including dynamic random access memory (DRAM);
   a power management block for the system; a plurality of IO (input/output) blocks; and
   a read only memory for storage of firmware for the one or more processors;
   wherein the system provides support for a board-level test of the system including testing of one or more IO blocks of the plurality of IO blocks; and
   wherein the firmware includes hooks to stall a reset sequence of the computing system including the system to branch to a mode that maintains power to the one or more IO blocks, wherein the mode is a semi-sleep mode.

14. The computing system of claim 13, wherein the reset sequence is to remain in an infinite loop in the semi-sleep mode during the board-level test.

15. The computing system of claim 13, wherein stalling of the reset sequence includes the system responding to assertion of a bootstrap.

16. The computing system of claim 15, wherein the computing system is to return to the reset sequence upon de-assertion of the bootstrap.

17. The computing system of claim 13, wherein the power management block includes capability to override reset and power wakeup signals in a reset sequence.

18. The computing system of claim 13, wherein the one or more IO blocks include one or more of a CSI (Camera Serial Interface) block, a Display block, or a DDR (Double Data Rate) block.

19. The computing system of claim 13, further comprising a transmitter or receiver for transmission or reception of data, and a dipole antenna for data transmission or reception.

20. A system comprising:
   a power management block for the system;
   a plurality of IO (input/output) blocks; and
   a read only memory for storage of firmware;
   wherein the system provides support for a board-level test of the system including testing of one or more IO blocks of the plurality of IO blocks; and
   wherein the firmware includes elements to stall a reset sequence of the system including the system to branch to a mode that maintains power to the one or more IO blocks, wherein stalling of the reset sequence includes the system to respond to assertion of a bootstrap, and wherein the system is to return to the reset sequence upon de-assertion of the bootstrap.

21. A computing system comprising:
   one or more processors; main memory including dynamic random access memory (DRAM);
   a power management block for the system; a plurality of IO (input/output) blocks; and
   a read only memory for storage of firmware for the one or more processors;
   wherein the system provides support for a board-level test of the system including testing of one or more IO blocks of the plurality of IO blocks; and
   wherein the firmware includes hooks to stall a reset sequence of the computing system including the system to branch to a mode that maintains power to the one or more IO blocks, wherein stalling of the reset sequence includes the system responding to assertion of a bootstrap, and wherein the computing system is to return to the reset sequence upon de-assertion of the bootstrap.

* * * * *